United States Patent [19]
Stone et al.

[11] Patent Number: 5,246,100
[45] Date of Patent: Sep. 21, 1993

[54] CONVEYOR BELT ZIPPER

[75] Inventors: James W. Stone, Northbrook, Ill.; Paul Tilman, New City, N.Y.

[73] Assignee: Illinois Tool Works, Inc., Glenview, Ill.

[21] Appl. No.: 668,584

[22] Filed: Mar. 13, 1991

[51] Int. Cl.⁵ .............................................. B65G 15/30
[52] U.S. Cl. ................................ 198/844.2; 24/31 L; 24/31 V
[58] Field of Search ............... 24/31 V, 31 R, 31 B, 24/38, 35, 576, 587, 31 L; 198/844.2; 474/253, 255

[56] References Cited

U.S. PATENT DOCUMENTS

| | | | |
|---|---|---|---|
| 2,558,367 | 6/1951 | Madsen | 24/576 |
| 2,652,611 | 9/1953 | Jaster | 24/399 |
| 2,794,228 | 6/1957 | Teher | 24/576 |
| 2,871,539 | 2/1959 | Swan | 24/576 X |
| 2,873,501 | 2/1959 | Renner | 24/31 V X |
| 3,440,696 | 4/1969 | Staller | 24/576 |
| 4,254,666 | 3/1981 | Seredick | 24/38 X |
| 4,846,770 | 7/1989 | Lane | 474/253 |
| 4,858,286 | 8/1989 | Siegel | 24/576 X |
| 4,929,487 | 5/1990 | Tilman et al. | 24/576 X |

Primary Examiner—James R. Brittain
Attorney, Agent, or Firm—Trexler, Bushnell, Giangiorgi & Blackstone, Ltd.

[57] ABSTRACT

A conveyor belt zipper has complementary connectable halves disposed on each end of the conveyor belt. Those halves have a plurality of teeth and recesses thereon, with the teeth being insertable into the recesses. The teeth are of different sizes, are supported by either a thick or a thin section of the half, or are constructed of either a flexible, or a inflexible material. Also, a reinforcing member can be attached to the halves in order to achieve the desired relative flexibility. In this manner, the zipper has sufficient strength to withstand tension due to a load on the belt, while also having sufficient flexibility to rotate easily around an end roller of the conveyor assembly.

9 Claims, 1 Drawing Sheet

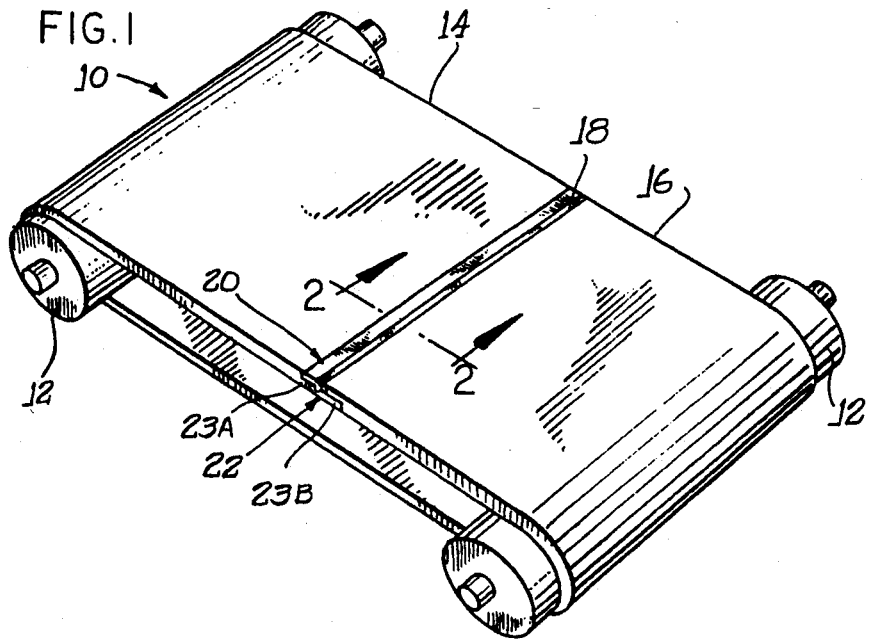
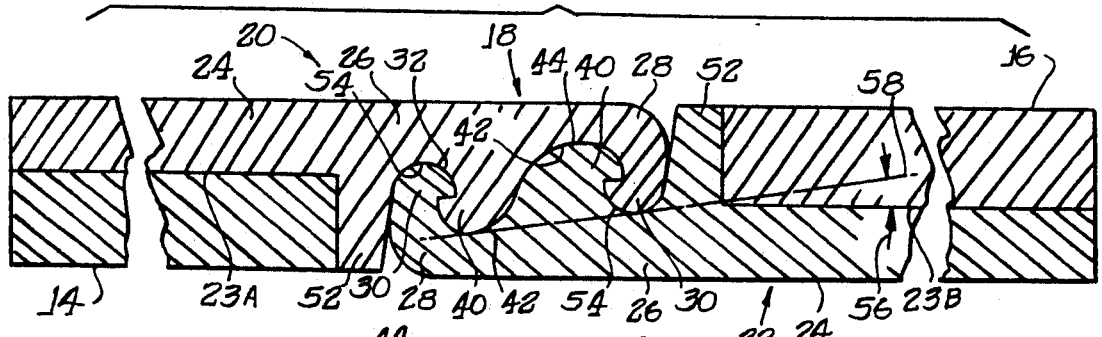
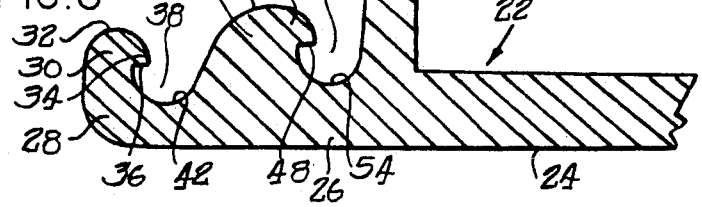
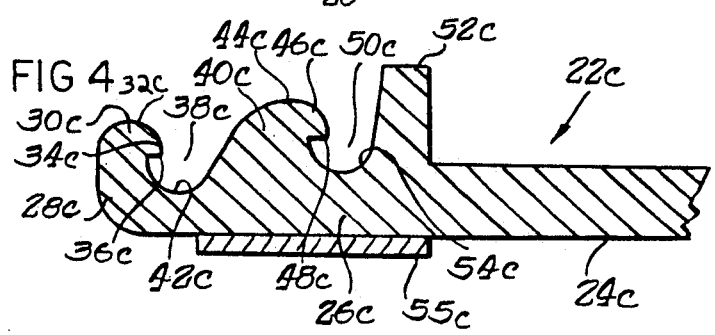

CONVEYOR BELT ZIPPER

BACKGROUND AND SUMMARY OF THE INVENTION

This invention relates generally to a unique means for connecting two ends of a belt, and, specifically, to a novel construction of a zipper used to join two ends of a conveyor belt. In many modern businesses, conveyor belts are used extensively. Many assembly lines employ conveyor belts in one way or another. Also, airlines and parcel services utilize conveyor belts to move cargo. Many of those conveyor belts operate around the clock. The employment of the conveyor belt has expanded to encompass almost every aspect of modern business.

Given the wide variety of uses for conveyor belts, and, more importantly, the length of the time periods of those uses, it is very important to have a conveyor belt that is reliable. Conveyor belts that have poor construction, especially in the means for connecting the two ends of the conveyor belt, are an unwanted liability to the modern businessman. Many problems are caused by a defective, or weakly constructed belt.

Specifically, conveyor belts are subject to great stress, and tension forces throughout the work day and beyond. The belt carries a large load, which adds a significant, gravitationally generated, force to the belt, which often compresses the belt against the rollers. This force is highly dangerous to the structural integrity of the belt.

When the belt rotates around an end roller at the end of the conveyor belt assembly, the gravitational force of the load generates a tension force directed opposite to the direction of belt travel. When the joint, or zipper, connecting the two ends of the conveyor belt rotates around the end roller, it too is subjected to the same tension force.

The actions of this force, compounded by the rotation of the zipper around the end roller, tend to cause the zipper to become undone, thereby breaking the connection between the two ends of the conveyor belt. When this happens, the conveyor experiences significant down time while an operator removes the load from the belt, and attempts to redo the zipper. This down time is reflected is decreased efficiency of, and decreased profits generated by the business, which is unacceptable to the modern businessman.

The prior art contains many belts which do not have connecting means having appropriate stiffness to prevent opening of the zipper. Therefore, a means for connecting the two ends of a conveyor belt which can withstand the effects of the tension force is desired. However, the need for the means to have strength when the belt is under tension must be balanced against the need for the means to flex around an end roller. Specifically, a zipper that is sufficiently stiff to withstand the propensity to become undone as it travels over an end roller, while also being sufficiently flexible to rotate easily over an end roller is desired.

OBJECTS AND SUMMARY OF THE INVENTION

A general object of the invention is to provide a means for connecting the two ends of a belt, or a zipper, that can resist the propensity for opening while rotating about an end roller.

Another object of the present invention is to provide a zipper that has appropriate stiffness to prevent opening, but appropriate flexibility to rotate about an end roller.

A further object of the invention is to provide a zipper that can hold two ends of a belt together with greater tensile loading than that of other, currently available means.

An additional object of the present invention is to provide a zipper having teeth of different heights and thicknesses.

Another object of the invention is to provide a zipper composed of different materials, at least one being firm and inflexible, and another being relatively flexible.

A further object of the present invention is to provide a zipper having thick and thin sections, so as to provide both strength and flexibility.

The means for flexibly connecting two ends of a belt of the present invention comprises a first and second complementary connectable halves, one each attached to a separate end of the belt. Each half has at least a first tooth and a second tooth; one being strong and relatively inflexible, the other being relatively flexible.

Preferably, one tooth is larger than the other. Also, recesses, with one edge thereof being defined by a tooth, capable of accepting the teeth, are disposed on the halves. Additionally, the strong, inflexible tooth is supported by a relatively thick section of the half.

BRIEF DESCRIPTION OF THE DRAWINGS

The organization and manner of the structure and operation of the invention, together with further objects and advantages thereof, may best be understood by reference to the following description taken in connection with the accompanying drawings, wherein like numerals identify like elements in which:

FIG. 1 is a partial elevational view of a conveyor belt possessing a zipper constructed according to the teachings of the present invention;

FIG. 2 is an enlarged sectional view, taken along line 2—2 of FIG. 1, showing the particular construction of the zipper when closed;

FIG. 3 is a side elevational view of one half of the zipper, with the conveyor belt removed, showing the particular construction of the zipper when open; and FIG. 4 is a side elevational view of one half of the zipper, with the conveyor belt removed, and a cap added, showing the particular construction of the zipper when open.

DETAILED DESCRIPTION OF A PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Although the invention will be discussed in relation to its employment in a conveyor belt, it is to be understood that the invention is not to be so limited, but has applications beyond those discussed herein.

A basic conveyor belt assembly is shown in FIG. 1. In short, the assembly comprises a conveyor belt 10, and a plurality of end rollers 12. The conveyor belt 10 has a first end 14 and a second end 16. The conveyor belt 10, and the conveyor belt assembly, is completed when the first and second ends 14 and 16 of the conveyor belt 10 are joined. To accomplish this, the conveyor belt 10 has a means for flexibly connecting the first and second ends 14 and 16, or a zipper 18.

The construction of the zipper 18 is disclosed more fully in FIG. 2. The zipper 18 comprises a first complementary connectable half 20, and a second complementary connectable half 22, disposed about the first and second ends 14 and 16 of the conveyor belt 10, respectively. The halves 20 and 22 are connectable to the ends 14 and 16 of the conveyor belt 10 by means of rivets, an adhesive, or the like, forming joints 23A and 23B between the first end 14 and the first half 20, and the second end 16 and the second half 22, respectively. The complementary connectable halves 20 and 22 are, necessarily, substantially identical in construction so that one can be joined to the other. Therefore, the construction of the complementary connectable halves will be discussed with respect to only one thereof, as shown in FIG. 3.

The complementary connectable halves 20 and 22 are comprised of a base portion 24. The base portion 24 is substantially planar, is parallel to the plane of the conveyor belt 10, and has a thick section 26 and a thin section 28. The base portion 24 terminates in a first tooth 30. The first tooth 30 extends upward, substantially perpendicularly, away from the base portion 24. The first tooth 30 terminates at a first tooth top or crest 32, and extends backwards, towards the conveyor belt 10, substantially parallel to the base portion 24 to form a tang or lip 34. The tang or lip 34 defines one edge of a notch 36, the construction and operation of which will become more clear herein.

Upon the base portion 24, between the first tooth 30 and the conveyor belt 10, is a first recess 38. One edge of the first recess 38 is defined by the first tooth 30, with another edge thereof being defined by a second tooth 40, also disposed about the base portion 24. The first recess 38 is of such a construction so as to be able to accept the second tooth 40 of the opposite complementary connectable half 20 or 22 therein to form part of the means for interengaging the ends 14 and 16 of the conveyor belt 10. The first recess 38 has a bottom surface 42 disposed at the base portion 24, and the first tooth 30 and the first recess 38 are disposed above the thin section 28 of the base portion 24.

The second tooth 40 is disposed between the first recess 38 and the conveyor belt 10. The second tooth 40 extends upwards, substantially perpendicularly, away from the base portion 24. The second tooth 40 terminates at a second tooth top or crest 44, and extends backwards, towards the conveyor belt 10, substantially parallel to the base portion 24, to form a tang or lip 46. The tang or lip 46 defines one edge of a notch 48, the operation and construction of which will become more clear herein.

Upon the base portion 24, between the second tooth 40 and the conveyor belt 10, is a second recess 50. One edge of the second recess 50 is defined by the second tooth 40, with another edge thereof being defined by a wall or flange 52, projecting from the base portion 24. The second recess 50 is of such a construction so as to be able to accept the first tooth 30 of the opposite complementary connectable half 20 or 22 therein to form part of the means for interengaging the ends 14 and 16 of the conveyor belt 10. The second recess 50 has a bottom surface 54 disposed at the base portion 24, and the second tooth 40, and the second recess are disposed above the thick section 26 of the base portion 24.

The flange 52 also is disposed above the thick section 26 of the base portion 24. The flange 52 is disposed between the second recess 50, and the conveyor belt 10. The flange 52 is substantially planar, and extends upwards, substantially perpendicularly, away from the base portion 24.

The construction of the thick section 26, the relatively large, second tooth 40, and the flange 52 is such that the portions of the zipper 18 provided by them are relatively inflexible and stiff, or firm and strong. This provides the zipper 18 with appropriate stiffness to resist opening when the zipper 18 rotates about the end roller 12. The thin section 28, and the relatively small, first tooth 30, on the other hand, have a construction such that the portions of the zipper 18 provided by them are relatively flexible, so that the zipper 18 has appropriate flexibility in order to rotate easily about the end roller 12.

A greater cross sectional area of one portion, or second tooth 40, of the zipper 18, as compared with a corresponding cross sectional area of the other portion, or first tooth 30, of the zipper 18 produces the desired relative flexibility of portions of the zipper 18, as described above. In another embodiment of the invention, the same relative flexibility can be achieved by co-extruding the zipper 18 from at least two different materials, such as PVC compounds having different durometer values, and the like.

Another embodiment, as shown in FIG. 4 wherein like reference numerals having the suffix "C" identify like elements, has a reinforcing member, or cap 55C disposed about the base portion 24C. The cap 55C, generally, is made of a relatively stiff and rigid material, such as PVC of high durometer value, and lends support to a portion of the zipper 18C. This construction assures that the portion of the zipper 18C supported by the cap 55C will be relatively stiff as compared to the portion of the zipper 18C that is not supported by the cap 55C. This embodiment also can be achieved by co-extruding the zipper 18C and the cap 55C from different materials, as described above.

Other differences in construction of the thick and thin sections 26 and 28, and the elements of the zipper 18 disposed thereon, are evident in FIG. 2 and FIG. 3. Specifically, the thick section 26 is of a height greater than that of the thin section 28. Also, the first tooth 30 has a cross section smaller than a corresponding cross section of the second tooth 40.

In addition, the height of the first tooth 30, or, in other words, the distance between the base portion 24 and the first tooth crest 32 is smaller than the height of the second tooth 40, or the distance between the base portion 24 and the second tooth crest 44. In this manner, an angle 56 is defined by a projection of one side of the conveyor belt 18, and an imaginary line 58 drawn through the bottom surface 42 of the first recess 38, and the bottom surface 54 of the second recess 50, as shown in FIG. 2.

The teeth 30 and 40 each have a center of mass. The teeth 30 and 40 are constructed so that an imaginary line drawn through the centers of mass of the teeth 30 and 40 is parallel to the imaginary line 58. In this manner, as the zipper 18 rotates about an end roller 12, a tension force on the conveyor belt 10 acts through an imaginary line substantially tangential to the surface of the end roller 12, and substantially parallel to the imaginary line 58. Therefore, the tension force acts along the imaginary line 58. With this construction, the zipper 18 is able to withstand greater tensile loading while also resisting the propensity for the zipper 18 to open as it rotates about an end roller 12.

The operation of the zipper 18 will become more clear in the following discussion. The first and second complementary connectable halves 20 and 22 are connected to the first and second ends 14 and 16, respectively, of the conveyor belt 10 forming the joints 23A and 23B.

Beginning with the first and second complementary connectable halves 20 and 22 being separate, similar to FIG. 3, the first and second ends 14 and 16 of the conveyor belt 10 are drawn together. The first and second complementary connectable halves 20 and 22 are positioned in proximity to each other in preparation for joining.

As the first and second complementary connectable halves 20 and 22 are joined, the elements disposed thereon interengage in the following manner. This discussion will involve only one of the complementary connectable halves 20 and 22, but it is to be understood that the process disclosed in this discussion occurs with respect to both halves 20 and 22.

The first tooth 30 of one half 20 or 22 is inserted between the second tooth 40 and the flange 52 of the other half 20 or 22 into the second recess 50 of the other half 20 or 22. Simultaneously, the second tooth 40 of the one half 20 or 22 is inserted between the first tooth 30 and the second tooth 40 of the other half 20 or 22 into the first recess 38 of the other half 20 or 22.

The first tooth 30 of one half 20 or 22 is inserted until its first tooth crest 32 confronts the bottom surface 54 of the second recess 50 of the other half 20 or 22. Also, the second tooth 40 of one half 20 or 22 is inserted until its second tooth crest 44 confronts the bottom surface 42 of the first recess 38 of the other half 20 or 22. At the same time, the tang 34 of the first tooth 30 slides over and behind the tang 46 of the second tooth 40. The tang 34 of the first tooth 30 slides into the notch 48 of the second tooth 40, and the tang 46 of the second tooth 40 is accepted by the notch 36 of the first tooth 30. The tangs 34 and 46 lock in place in their respective notches 36 and 48, thereby forming locking means, and completing the joining of the first and second complementary connectable halves 20 and 22, and closing the zipper 18. The conveyor belt 10 now is continuous, and ready for operation.

In operation, when a load is placed on the conveyor belt 10, the thick section 26, and elements disposed thereon, resist the tension forces generated by the load. Also, when the zipper 18 rotates over an end roller 12, the thin section 28, and the elements disposed thereon, allow the zipper 18 to flex around the end roller 12. In this manner, the zipper 18 of the present invention properly balances the need for the zipper 18 to flex around an end roller 12 against the need for the zipper 18 to have strength when the conveyor belt 10 is under tension.

The zipper 18 of the present invention is highly unique in is construction, and properties. The zipper 18 is sufficiently stiff to withstand the propensity to become undone as it travels over an end roller 12. However, the zipper 18 is sufficiently flexible to rotate easily over an end roller 12. The particular disposition of the teeth 30 and 49, and the thick and thin portions 26 and 28 give the zipper 18 the ability to handle greater tensile loading than other, currently available belt joining means. Because of these aspects, among others, of the zipper 18, the zipper 18 is a necessary asset of the modern business man who employs conveyor belts.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A fastener for flexibly connecting two ends of a conveyor belt of predetermined thickness comprising: complementary connectable halves respectively connectable with the ends: the complementary connectable halves having one end portion connectible with an end of the conveyor belt and an opposite end portion having a first tooth, a second tooth, and a flange positionable adjacent an end of the belt and having a thickness similar to that of the belt; the first tooth being smaller than the second tooth in size; the second tooth being disposed between the first tooth and the flange; a first recess being disposed between the first and second teeth, and a second recess being disposed between the second tooth and the flange; the first recess being constructed so as to accept the second tooth of the other complementary connectable half; and the second recess being constructed so as to accept the first tooth of the other complementary connectable half.

2. A fastener as defined in claim 1 wherein the first tooth is relatively flexible as compared to the second tooth.

3. A fastener as defined in claim 1 which includes locking means comprising a tang disposed on each tooth, one edge of a notch being defined by the tan, and the notch of one tooth for accepting the tang of another tooth.

4. A fastener as defined in claim 1 wherein a reinforcing member is disposed on at least one of the complementary connectable halves so as to render one portion of the halves relatively stiff as compared to another portion of the halves.

5. A conveyor belt structure comprising a belt of predetermined thickness and a zipper connected to opposite ends of the belt and having a thickness substantially equal to the predetermined thickness, the zipper comprising: first and second complementary connectable halves, respectively attached to opposite ends of a belt; each half comprising a base portion having a first end portion thinner than the predetermined thickness and secured to the belt, and only a first endmost tooth, and a second tooth extending from the base portion; the second tooth of each base portion being relatively strong and inflexible as compared with the other tooth of each base portion; and the relatively strong and inflexible tooth of each base portion being releasably interconnected with the other tooth of the other base portion.

6. A structure as defined in claim 5 wherein the relatively strong and inflexible tooth has a cross section greater than a corresponding cross section of the other tooth.

7. A structure as defined in claim 5 which includes locking means comprising a tang disposed on each tooth and interengagable with a tang on an adjacent tooth.

8. A structure as defined in claim 5 including at least one reinforcing member disposed on at least one of the base portions, the reinforcing member rendering one portion of the complementary connectable halves relatively inflexible as compared with another portion of the complementary connectable halves.

9. A structure as defined in claim 5 wherein the connectable halves respectively include a flange extending from the base portion and abutting an adjacent end of the belt, each flange engaging an endmost tooth of the other half.

* * * * *